US 9,260,037 B2

(12) United States Patent
Graham et al.

(10) Patent No.: US 9,260,037 B2
(45) Date of Patent: Feb. 16, 2016

(54) CANTILEVER ASSEMBLY

(75) Inventors: Gary Graham, Lewisville, NC (US);
Matthew Casey, Goldsboro, NC (US)

(73) Assignee: IMPULSE NC LLC, Mount Olive, NC (US)

( * ) Notice: Subject to any disclaimer, the term of this patent is extended or adjusted under 35 U.S.C. 154(b) by 0 days.

(21) Appl. No.: 12/930,488

(22) Filed: Jan. 7, 2011

(65) Prior Publication Data

US 2012/0175479 A1    Jul. 12, 2012

(51) Int. Cl.
| | |
|---|---|
| *B60M 1/20* | (2006.01) |
| *A47F 7/00* | (2006.01) |
| *A47F 5/00* | (2006.01) |
| *F16M 11/00* | (2006.01) |
| *F16M 13/00* | (2006.01) |

(52) U.S. Cl.
CPC ...................................... *B60M 1/20* (2013.01)

(58) Field of Classification Search
CPC . F16M 11/04; F16M 2200/044; F16M 11/24; F16M 11/10; F16M 11/42; B60M 1/20
USPC .................... 248/123.11, 300, 274.1, 288.11, 248/288.51, 29.11, 298.1, 299.1, 227.3, 248/218.4, 219.3, 219; 52/647, 650.1; 191/40; 174/40 R; 403/253, 254, 256, 403/257, 258, 259
See application file for complete search history.

(56) References Cited

U.S. PATENT DOCUMENTS

| | | | |
|---|---|---|---|
| 446,546 | A | 2/1891 | Cook et al. |
| 1,076,630 | A | 10/1913 | Davis et al. |
| 2,700,705 | A | 1/1955 | Anjeskey et al. |
| 3,222,464 | A | 12/1965 | Dehn |

(Continued)

FOREIGN PATENT DOCUMENTS

| | | |
|---|---|---|
| CN | 201272254 | 7/2009 |
| DE | 3207238 | 9/1983 |

(Continued)

OTHER PUBLICATIONS http://en.wikipedia.org/wiki/File:Extruded_aluminium_section_x3.jpg.*

(Continued)

*Primary Examiner* — Jonathan Liu
*Assistant Examiner* — Muhammad Ijaz
(74) *Attorney, Agent, or Firm* — Levenfeld Pearlstein, LLC

(57) ABSTRACT

A cantilever assembly includes a cantilever arm having a pair of longitudinal fastening channels with a corresponding pair of slots in communication with the fastening channels. An attachment bracket features a connector portion and a pair of spaced leg portions defining a seat there between with each leg portion having at least one aperture. The leg portions also each have an inner surface featuring an elongated groove with each being in communication with a corresponding one of the apertures. The elongated grooves are positioned in alignment with the slots of the cantilever arm when the cantilever arm is positioned in the seat of the attachment bracket. Tee bolts having a shaft portion and an oblong head portion movably pass through the apertures of the attachment bracket with the oblong head portions pivotable between a first orientation where they may be positioned within the elongated grooves of the attachment bracket and passed through the slots and into and out of the fastening channels of the cantilever arm, and a second orientation where they are secured within the fastening channels of the cantilever arm.

14 Claims, 7 Drawing Sheets

(56) References Cited

U.S. PATENT DOCUMENTS

| | | | |
|---|---|---|---|
| 3,334,197 A * | 8/1967 | Donald et al. | 191/40 |
| 3,462,110 A * | 8/1969 | Cheslock | 248/219.4 |
| 3,644,688 A | 2/1972 | Tustin et al. | |
| 4,163,537 A * | 8/1979 | Mourgue | 248/188.1 |
| 4,496,061 A | 1/1985 | Highsmith | |
| 4,679,672 A * | 7/1987 | Seddon et al. | 191/41 |
| 4,941,763 A * | 7/1990 | Euteneuer | 403/3 |
| 5,380,961 A * | 1/1995 | Ronning et al. | 191/41 |
| 5,634,300 A | 6/1997 | Huebner et al. | |
| 5,657,842 A | 8/1997 | Krenkel et al. | |
| 5,772,158 A | 6/1998 | Blanding | |
| 5,881,851 A * | 3/1999 | Cipriani | 191/41 |
| 5,979,119 A * | 11/1999 | Trafton | 52/40 |
| 6,185,887 B1 * | 2/2001 | Strassle | 52/282.2 |
| 6,347,592 B1 | 2/2002 | Gessert | |
| 6,349,912 B1 * | 2/2002 | Schauss et al. | 248/298.1 |
| 7,090,174 B2 * | 8/2006 | Korczak et al. | 248/61 |
| 7,159,262 B2 | 1/2007 | Jackson | |
| 7,389,621 B2 * | 6/2008 | Hawes | 52/655.1 |
| 7,441,311 B2 | 10/2008 | Lovgren et al. | |
| 7,654,057 B2 * | 2/2010 | Zambelli et al. | 52/710 |
| 7,748,420 B2 | 7/2010 | Young | |
| 8,888,056 B2 * | 11/2014 | Lu et al. | 248/123.11 |
| 2007/0277445 A1 | 12/2007 | Michell | |
| 2009/0064626 A1 | 3/2009 | Sen | |
| 2010/0226732 A1 * | 9/2010 | Baumgartner et al. | 411/387.1 |
| 2012/0061197 A1 * | 3/2012 | Pasta et al. | 191/40 |

FOREIGN PATENT DOCUMENTS

| | | | | |
|---|---|---|---|---|
| GB | 800575 | | 8/1958 | |
| GB | 835227 | | 5/1960 | |
| GB | 904944 | | 9/1962 | |
| GB | 933972 | | 8/1963 | |
| JP | 56079031 A | * | 6/1981 | B60M 1/12 |
| JP | 11-81487 | | 3/1999 | |
| JP | 2003080977 | | 3/2003 | |
| JP | 2004276882 | | 10/2004 | |
| RU | 2021919 | | 10/1994 | |
| WO | WO0013929 | | 3/2000 | |
| WO | WO 2010136955 A2 | * | 12/2010 | |

OTHER PUBLICATIONS http://www.castlecraft.com/trailex_storage_racks.htm, retrieved on Aug. 5, 2010.
http://www.mudstuff.co.uk/Cargo_Tracking_Mac'sTieDowns.shtml, retrieved on Aug. 5, 2010.
Cargo Bed Tie Down Cleats for Toyota Tacoma.
English Translation of JP 2003080977 published Mar. 19, 2003.
English Translation of CN 201272254 published Jul. 15, 2009.
English Translation of DE 3207238 published Sep. 1, 1983.
English Translation of JP JP2004276882 published Oct. 7, 2004.
International Search Report and Written Opinion from PCT/US2012/020467 dated May 4, 2012.

* cited by examiner

US 9,260,037 B2

CANTILEVER ASSEMBLY

FIELD OF THE INVENTION

The present invention relates to overhead contact systems in the transit traction power industry and, more particularly, to a cantilever assembly for such systems.

BACKGROUND

Electrified train transit systems are popular in urban settings due to their low level of pollution and high efficiency and reliability. Such transit systems typically feature an electric locomotive that pulls train cars for carrying passengers and that receives power from an overhead contact system. Overhead contact systems typically feature messenger and contact wires that are suspended over the track that the electric train cars travel on. The top of the electric locomotive is provided with a pantograph which contacts the contact wire so that the locomotive receives power.

The messenger and contact wires are typically suspended by a cantilever assembly, such as the one indicated in general at 8 in FIG. 1. As illustrated in FIG. 1, the cantilever assembly includes two or more insulated, rigid cantilever arms, illustrated at 10 and 12, that are attached by their proximal ends via members 14 and 16 to a pole 18 positioned next to the tracks. The distal end of the lower cantilever arm 12, which features a tilted orientation, is typically attached to the underside of the upper cantilever arm 10, which is positioned in a generally horizontal orientation. As a result, the lower cantilever arm provides support for the upper cantilever arm. A messenger saddle 20 is typically positioned at the distal end of the upper cantilever arm. A steady arm 21 is typically attached by its proximal end to the lower cantilever arm, and an insulated swivel clamp 22 for the contact wire is typically positioned at the distal end of the steady arm. The messenger passes over the saddle 20 and its ends are connected to the contact wire by hangers to form a bridal assembly where the contact wire is suspended by both the swivel clamp 22 and the messenger cable.

As is clear from the above, the cantilever assembly, which includes the upper and lower cantilever arms and the steady arm, are critical components for securing and maintaining contact and messenger wire heights and locations in an overhead contact system. Steel pipe is typically used for the upper and lower cantilever arms and the steady arm. This makes the components heavy and difficult to handle and install. A need therefore exists for a cantilever and steady arms that provide a reduction in weight.

As is also likely apparent from the above, the cantilever assembly must be properly configured for optimal performance. In addition, a large number of cantilever assemblies must be assembled and installed for an overhead contact system. As illustrated in FIG. 1, prior art cantilever assemblies typically use clevis pipe clamps 24 and 26 to secure the distal end of the lower cantilever arm to the underside of the upper cantilever arm and to secure the proximal end of the steady arm to the lower cantilever arm. Such clamps feature a number of different parts that are difficult to handle during installation and may become easily separated and lost. In addition, assembly and tightening of the clamps is time consuming. A need therefore also exists for a fastening bracket for the cantilever and steady arms of a cantilever assembly that is quick and easy to install and that remains as a single assembly during installation.

DETAILED DESCRIPTION OF EMBODIMENTS

Figure 2:
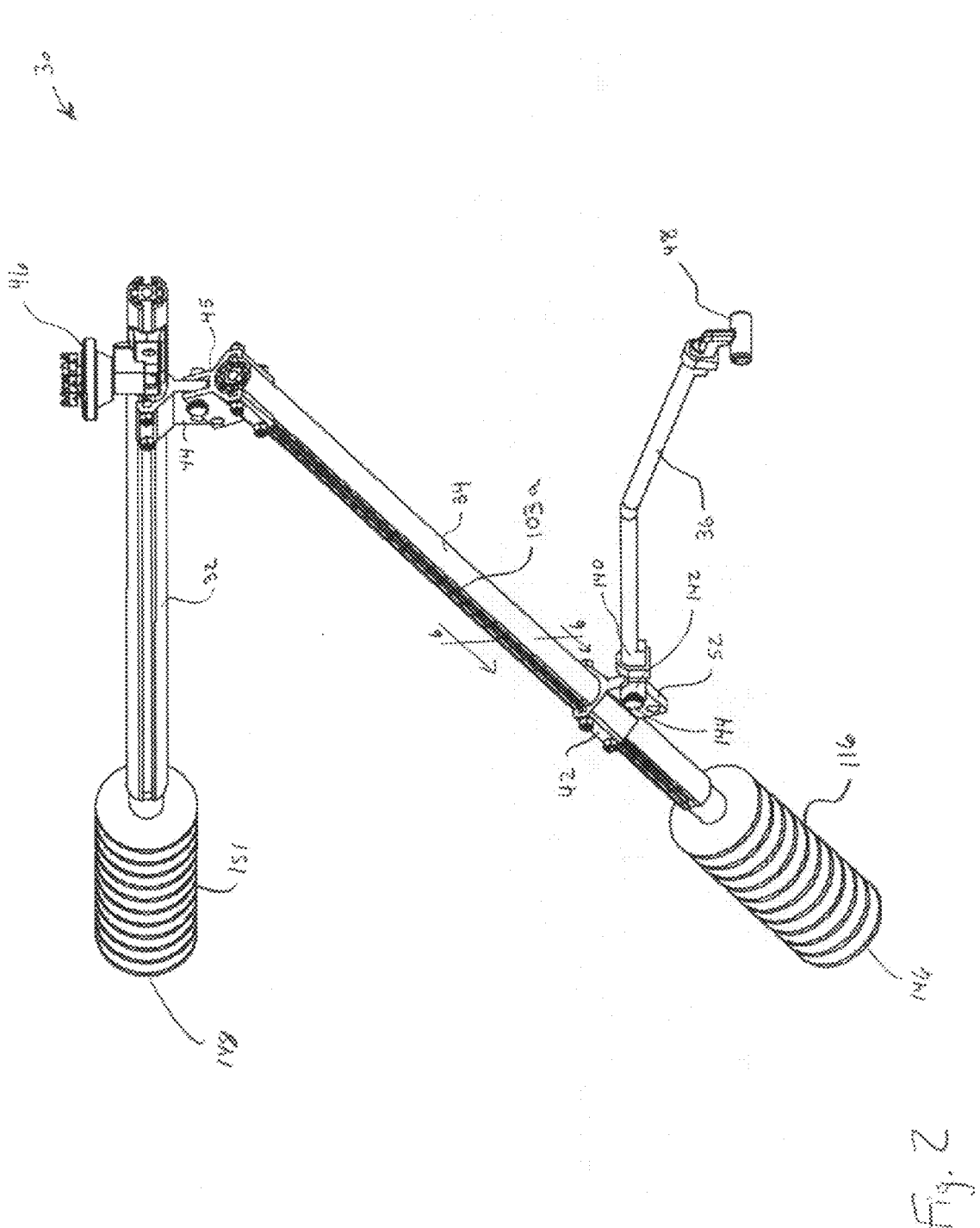
FIG. 2 is a perspective view of an embodiment of the cantilever assembly of the invention.

An embodiment of the cantilever assembly of the present invention is indicated in general at 30 in FIG. 2. The assembly includes an upper cantilever arm 32, a lower cantilever arm 34 and a steady arm 36. The upper and lower cantilever arms 32 and 34 and the steady arm 36 are each preferably extruded from aluminum. The steady arm preferably includes an inverted U-shaped cross section to provide weight and material savings while providing rigidity. Alternative materials, such as plastics or composites, and manufacturing methods may alternatively be used for each component. In accordance with the present invention, the three components are secured together with attachment brackets 42, 44 and 45, as described in greater detail below. Attachment brackets 42, 44 and 45 are also preferably extruded from aluminum. A messenger saddle 46 is positioned on the distal end of the upper cantilever arm 32, while a contact wire swivel clamp 48 is attached to the distal end of the steady arm 36.

The outside diameter of the upper and lower cantilever arms 32 and 34 preferably matches that of a steel pipe (typically 2.375 inches). This allows the attachment of hardware already designed for a nominal 2 inch pipe.

Figure 3:
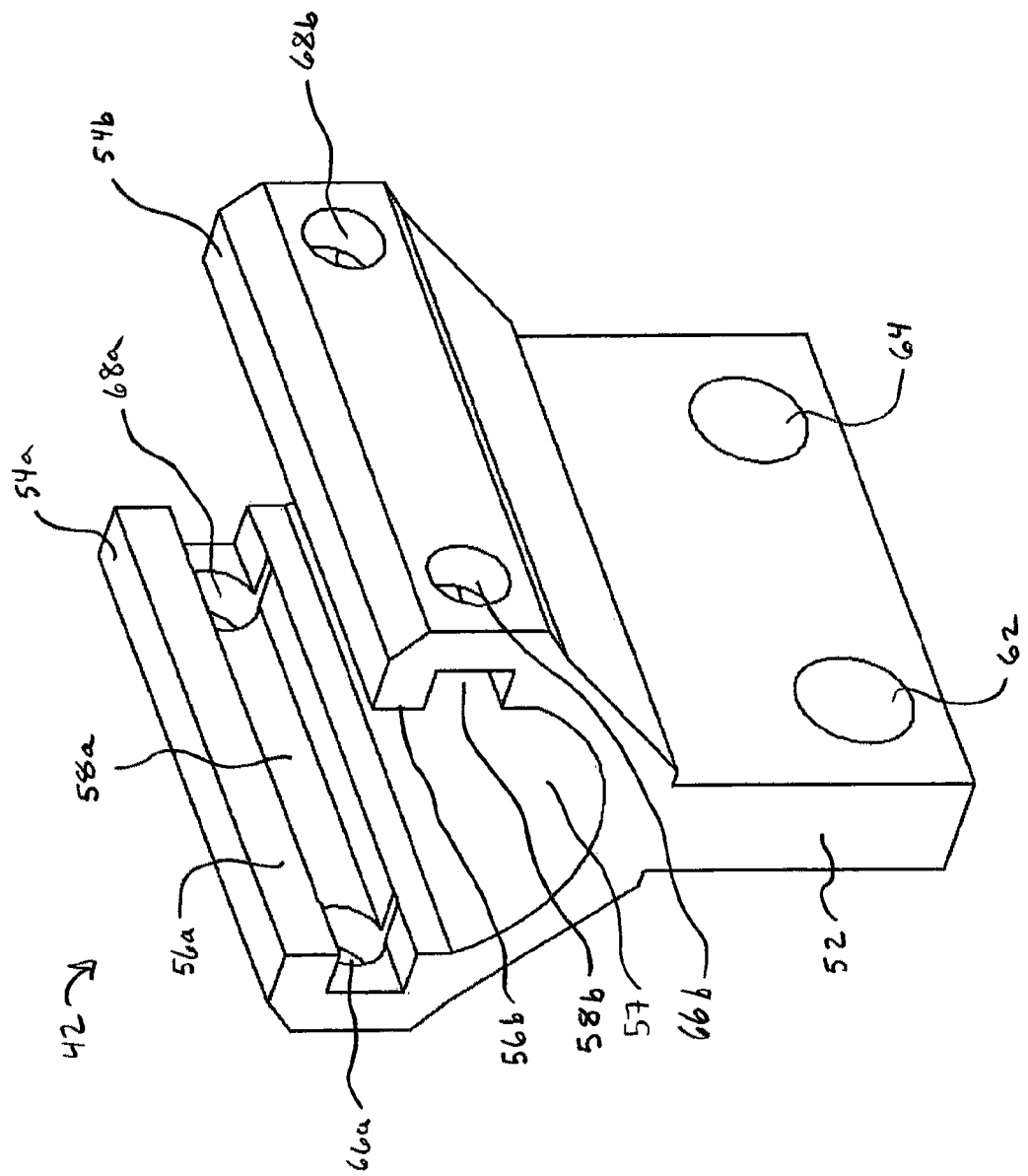
FIG. 3 is an enlarged perspective view of the attachment bracket of the cantilever assembly of FIG. 2.

An enlarged view of attachment bracket 42 is provided in FIG. 3. Attachment bracket 44 features a similar appearance and construction. As is apparent from FIG. 3, the attachment bracket features a generally Y-shaped cross section with a bottom fin connector portion 52 and upwardly extending leg portions 54a and 54b. The inner surfaces 56a and 56b of leg portions 54a and 54b define a generally U-shaped seat 57 and are provided with elongated grooves 58a and 58b, respectively. A pair of openings 62 and 64 are provided in fin connector portion 52. In addition, apertures 66a, 66b, 68a and 68b are provided in the leg portions with apertures 66a and 68a in communication with elongated groove 58a and apertures 66b and 68b in communication with elongated groove 58b. The number of openings and apertures shown are examples only and the fin and leg portions of the attachment bracket may be provided with more or less openings and apertures as is suitable for the application.

Figure 4:
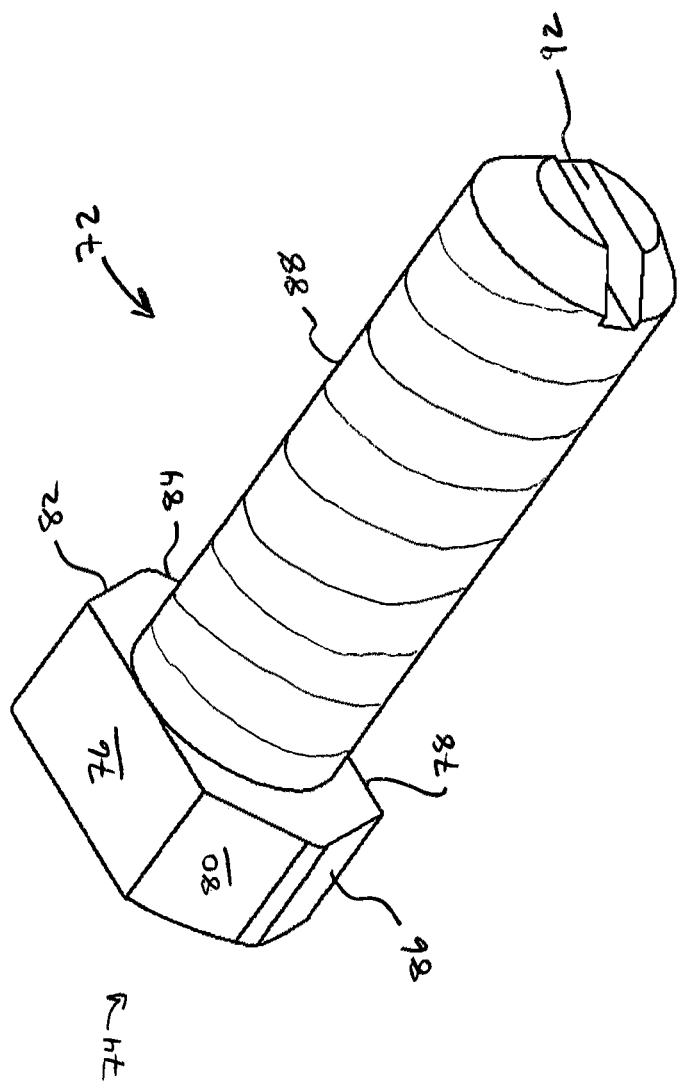
FIG. 4 is an enlarged perspective view of the tee bolt of the cantilever assembly of FIG. 1.

A tee bolt for use with the attachment bracket of FIGS. 2 and 3 is indicated in general at 72 in FIG. 4. The tee bolt includes an oblong head portion, indicated in general at 74. The oblong head features side portions 76 and 78 and corner portions 80, 82, 84 and 86. The tee bolt also includes a threaded shaft 88 with one end adjacent to the oblong head portion 74, and the other end provided with tool engagement portion, which in this embodiment is a recess 92. Alternative tool engagement portions may be used in place of recess 92 and include a bolt head or any other protrusion or recess that may be engaged by a tool for turning the tee bolt. The tee bolt may be constructed as a single piece or constructed as two pieces that are joined. The tee bolt preferably is constructed from metal.

Figure 5:
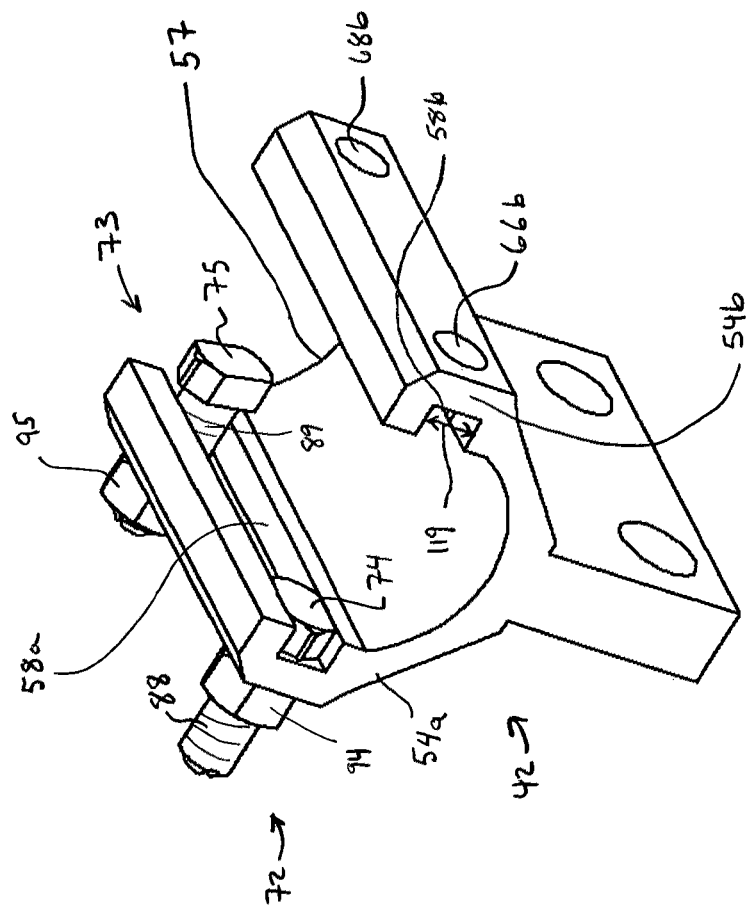
FIG. 5 is a perspective view of two tee bolts of the type illustrated in FIG. 4 installed on the attachment bracket of FIG. 3.

As illustrated in FIG. 5, tee bolt 72 and tee bolt 73 (which features a construction identical to tee bolt 72) pass through apertures 66a and 68a (FIG. 4) of leg portion 54a of the attachment bracket 42. The threaded shaft of each tee bolt has a diameter that is sized smaller than the diameters of apertures 66a and 68a so that the threads of the tee bolt threaded shafts do not engage the apertures (which are not threaded) as the tee bolts pass there through. Lock nuts 94 and 95 engage the threaded shafts 88 and 89 of the tee bolts so that they do not become separated from the attachment bracket prior to installation and for use during installation, the latter of which will be explained below.

With reference to FIG. 5, when the lock nuts 94 and 95 are positioned near the ends of the tee bolts opposite the oblong head portions, as shown for lock nut 95, the oblong head portion of the corresponding tee bolt (in this case oblong head portion 75) may be moved into the U-shaped seat 57 as the tee bolt shaft 89 slides through the corresponding aperture (68a in FIG. 3) in attachment bracket leg portion 54a. The oblong head portions 74 and 75 of the tee bolts and the elongated groove 58a are sized so that the oblong head portions may be positioned within the elongated groove when the oblong head portion is oriented as shown in FIG. 5 for oblong head portion 74 of tee bolt 72. When the oblong head portions of the tee bolts are oriented as shown for oblong head portion 75, however, the oblong head portion does not fit within the elongated groove 58a. Tee bolts engage apertures 66b and 68b of attachment bracket leg portion 54b in the same fashion.

Figure 6:
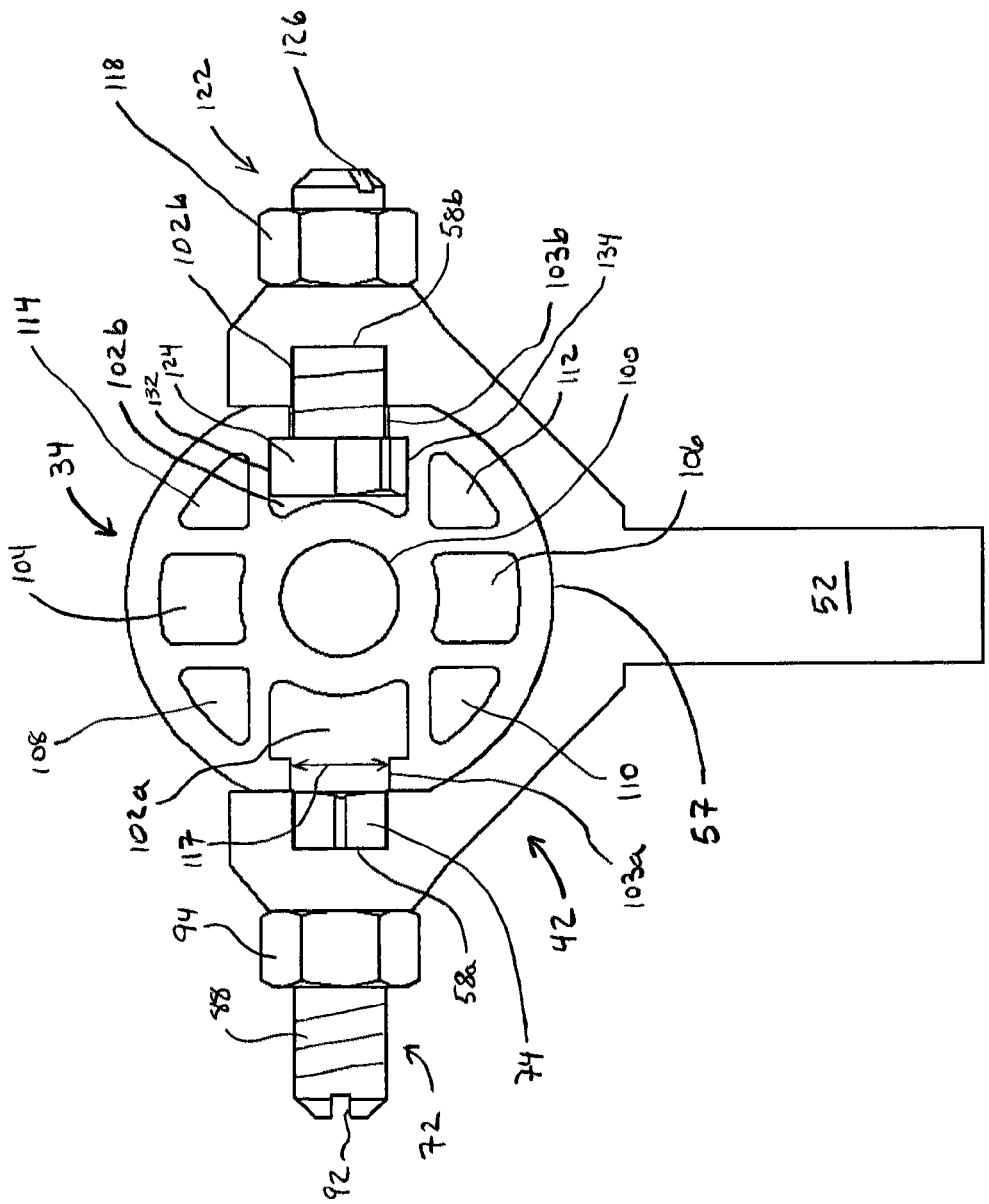
FIG. 6 is a sectional view taken along line 6-6 of FIG. 2 illustrating installation of the attachment bracket on the lower cantilever arm of FIG. 2.

As illustrated in FIG. 6, lower cantilever arm 34 features a central cylindrical bore 100 that is flanked by longitudinal fastening channels 102a and 102b. Fastening channels 102a and 102b feature side opening slots 103a and 103b (see also FIGS. 2 and 7). In order to provide weight and material savings, the cantilever arm 34 preferably includes generally square ducts 104, 106 and generally triangular ducts 108, 110, 112 and 114 that run parallel to central bore 100 and fastening channels 102a and 102b. Central bore 100 is preferably threaded so that components such as insulator 116 (FIG. 2) may be attached to the cantilever arm. Upper cantilever arm 32 (FIG. 2) features the same construction as lower cantilever arm 34. Alternative embodiments of the upper and lower cantilever arms may optionally eliminate, or vary the shape of, some or all of the square and triangular ducts, as well as the central bore. In addition, alternative embodiments of the cantilever arms may feature an overall cross section that is a shape other than round (such as octagonal, square, triangular, etc.). Of course the shape of the leg portions and seat of the attachment bracket would have to be changed accordingly.

Prior to installation of the attachment bracket, the tee bolts are preferably configured as illustrated by tee bolt 72 in FIGS. 5 and 6. More specifically, the oblong head portion 74 of the tee bolt is secured within the elongated groove 58a by tightening lock nut 94 against the exterior surface of leg portion 54a of the attachment bracket. By configuring all four tee bolts in this fashion, their movement with respect to the attachment bracket is prevented, thus greatly reducing the chance that any of the locks nuts will loosen and become lost, along with the corresponding tee bolts. In addition, this configuration greatly simplifies installation of the attachment bracket to a cantilever arm.

With reference to FIG. 6, the attachment bracket 42 is easily and quickly attached to the lower cantilever arm 34 by placing the cantilever arm within the seat 57 of the attachment bracket (as illustrated in FIGS. 2 and 6). This is easily accomplished because all of the oblong heads of the tee bolts are positioned in the elongated grooves 58a and 58b of the leg portions of the attachment bracket. As illustrated in FIG. 6, the height of slots 103a and 103b of channels 102a and 102b of the cantilever arm, illustrated at 117 for slot 103a, is approximately the same as the height of grooves 58a and 58b, illustrated at 119 for groove 58b in FIG. 5, of the leg portions of the attachment bracket. The dimensions of the seat 57 of the attachment bracket also correspond to the diameter and positions of the slots 103a and 103b of the cantilever arm so that the slots align with the elongated grooves when the cantilever arm is positioned within the seat 57.

In reference to FIG. 6, with the lower cantilever arm 34 positioned in the seat 57 of the attachment bracket, the lock nut 118 of tee bolt 122 is loosened, and the oblong head portion 124 of the tee bolt is moved inward into the fastening channel 102b. A screwdriver is then used to engage the recess 126 of the tee bolt and pivot or turn it so that the oblong head portion of the tee bolt is pivoted within the fastening channel 102b. When this occurs, corner portions 82 and 86 (FIG. 4) of the oblong head portion of the tee bolt engage the top and bottom surfaces 132 and 134 (FIG. 6) of the fastening channel 102b, respectively. The top and bottom edges of the slot 103b prevent the oblong head portion of the tee bolt from being withdrawn from the fastening channel 102b. Locking nut 118 is then tightened to the position illustrated in FIG. 6 to lock the tee bolt in position. The operation is repeated for the remaining tee bolts of the attachment bracket. As a result, the attachment bracket 42 is quickly and securely fastened to the lower cantilever arm as illustrated in FIG. 2.

With reference to FIG. 2, the steady arm 36 is attached at its proximal end 140 by a connector 142 to the fin 52 of the attachment bracket 42. The connector 142 is secured to the fin by a bolt or other fastener 144 that passes through opening 62 (FIG. 3) of the fin 52.

Figure 1:
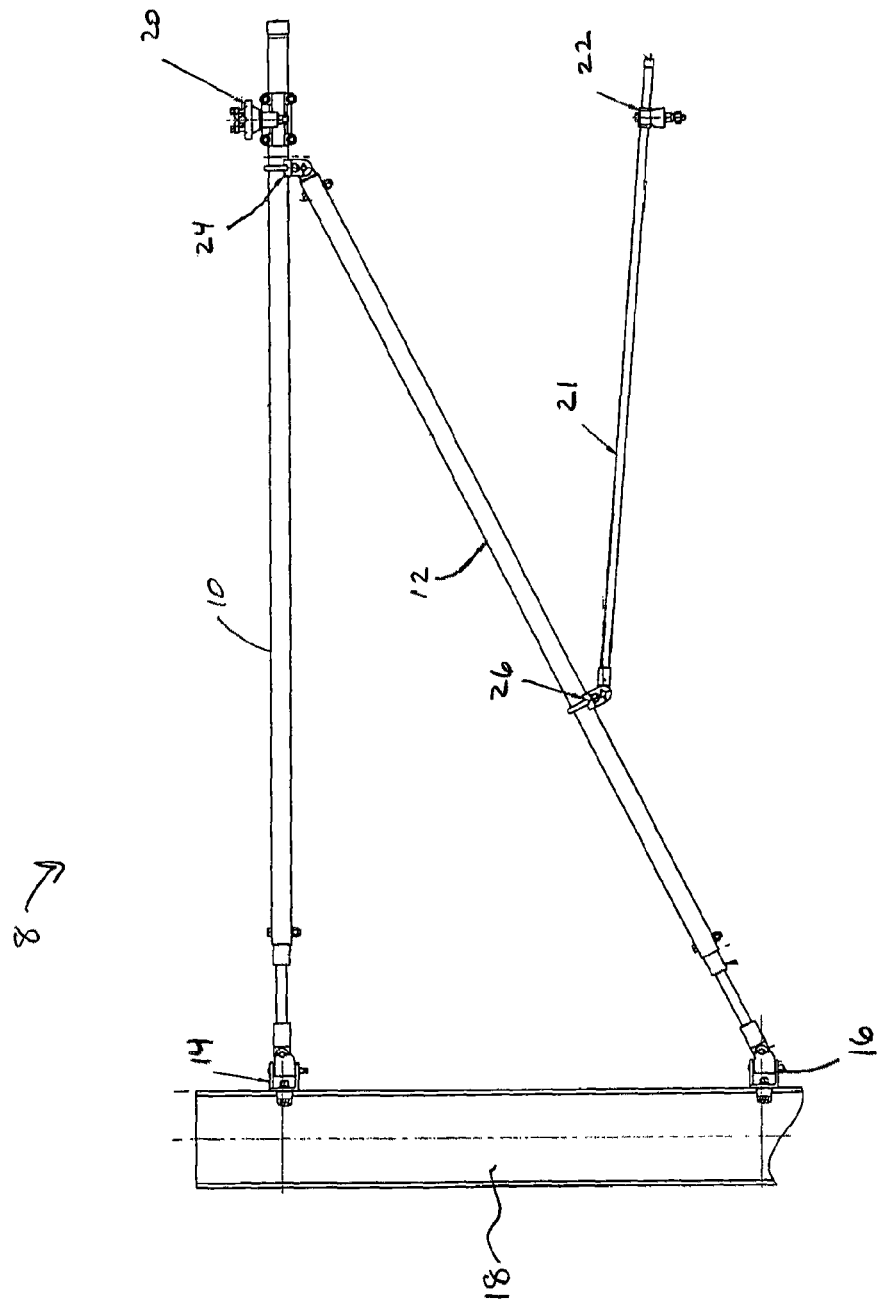
FIG. 1 is a side elevational view of a prior art cantilever assembly.

With reference to FIG. 2, the proximal ends 146 and 148 of insulators 116 and 151 are adapted to be mounted to a support such as a wall or pole (not shown), in the matter illustrated in FIG. 1 for the latter. The insulators may be excluded so that the proximal ends of the upper and lower cantilever arms 32 and 34 are instead attached to the pole or wall.

Figure 7:
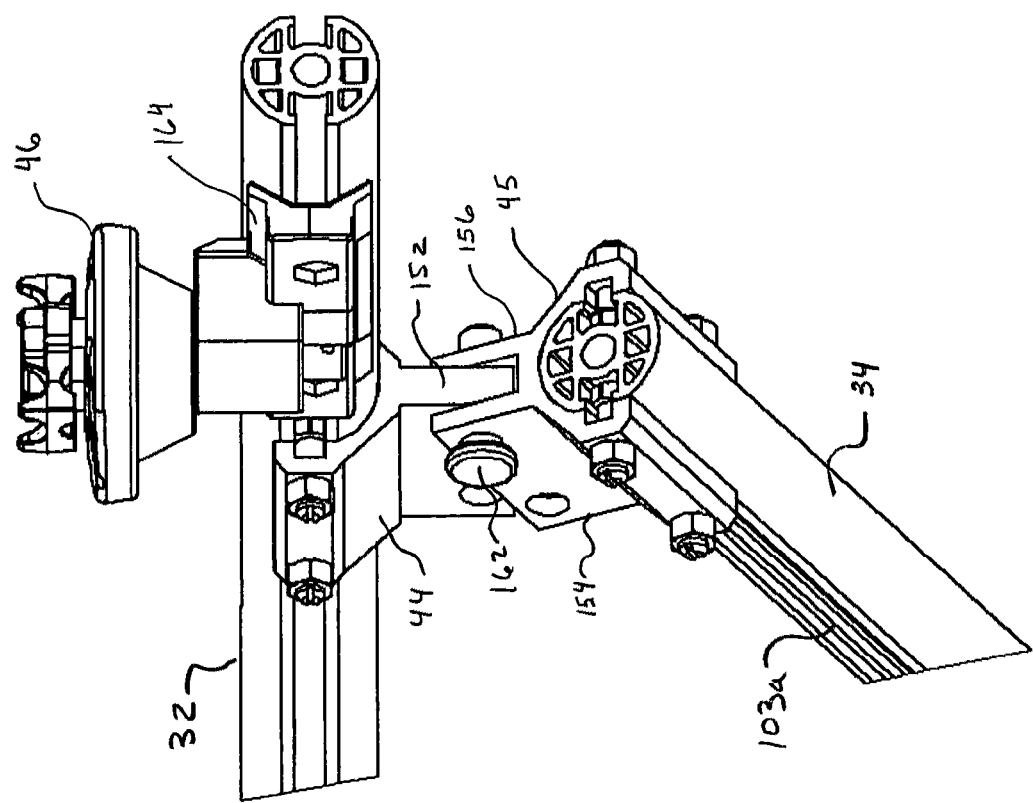
FIG. 7 is an enlarged perspective view of the distal ends of the upper and lower cantilever arms with the attachment brackets and other components installed.

As illustrated in FIG. 7, attachment bracket 44 is attached to the upper cantilever arm 32 in the same fashion described above with reference to FIGS. 2-6 for attachment bracket 42 and lower cantilever arm 34. As with bracket 42, attachment bracket 44 features a connector portion in the form of a downwardly extending fin 152. An attachment bracket 45 is attached to the distal end of the lower cantilever arm 34 in the same fashion described above with reference to FIGS. 2-6 for attachment bracket 42 and lower cantilever arm 34. Attachment bracket 45 features a construction and operation similar to attachment brackets 42 and 44, except it features a pair of spaced fins 154 and 156 as the connector portion, instead of the single fin 52 of attachment bracket 42 (FIG. 3) and the single fin 152 of attachment bracket 44. The connector portion of the attachment bracket may take many other forms to attach to various other components. As shown in FIG. 7, the single fin 152 of attachment bracket 44 is positioned between the fins 154 and 156 of attachment bracket 45. The pieces are secured together by a bolt or other fastener 162 that passes through corresponding openings in the fins 152, 154 and 156.

As noted above, a messenger seat 46 is attached to the distal end of the upper cantilever arm. This may be accomplished by a bracket 164 that operates in a fashion similar to attachment brackets 42, 44 and 45.

The above embodiment of the present invention therefore provides a lightweight but rugged and durable structure whereby the components are quickly and securely fastened together. The above embodiment also allows for quick adjustment of the cantilever assembly and allows other components to be quickly, easily and securely attached to the upper and/or the lower cantilever arms.

While the preferred embodiments of the invention have been shown and described, it will be apparent to those skilled in the art that changes and modifications may be made therein without departing from the spirit of the invention, the scope of which is defined by the appended claims.

What is claimed is:

1. A cantilever assembly comprising:
   a) an upper cantilever arm having a first longitudinal fastening channel and a second longitudinal fastening channel and a proximal end portion and a distal end portion, said first longitudinal and second longitudinal fastening channels being generally parallel to one another;
   b) an upper attachment bracket featuring:
      i. a connector portion, a first leg portion and a second leg portion spaced from and opposing the first leg portion, said first and second leg portions defining a seat there between;
      ii. a first fastener having a shaft portion with a longitudinal axis and an oblong head portion and a second fastener having a shaft portion with a longitudinal axis and an oblong head portion;
      iii. said first leg portion having a first leg aperture passing there through and said second leg portion having a second leg aperture passing there through;
      iv. the shaft portion of said first fastener passing through the first leg aperture of the first leg portion of the upper attachment bracket and the shaft portion of the second fastener passing through the second leg aperture of the second leg portion of the upper attachment bracket with the longitudinal axes of the first and second fastener shaft portions being axially aligned or generally parallel to each other;
      v. said oblong head portion of the first fastener positioned within the first fastening channel of the upper cantilever arm and said oblong head portion of the second fastener positioned within the second fastening channel of the upper cantilever arm with the distal end portion of said upper cantilever arm positioned within the seat of the upper attachment bracket;
   c) a lower cantilever arm having a first longitudinal fastening channel and a second longitudinal fastening channel and a proximal end portion and a distal end portion;
   d) a lower attachment bracket featuring:
      i. a connector portion;
      ii. first and second fasteners attached to the connector portion of the lower attachment bracket;
      iii. said first fastener engaging the first fastening channel at the distal end portion of the lower cantilever arm and said second fastener engaging the second fastening channel at the distal end portion of the lower cantilever arm;
   e) said upper and lower attachment brackets pivotally connected to one another so that the distal end portion of the lower cantilever arm is pivotally connected to the upper cantilever arm so that the lower cantilever arm is adapted to support the upper cantilever arm.

2. The cantilever assembly of claim 1 wherein the upper and lower cantilever arms each features a generally round cross section and the upper and lower attachment brackets are each generally U-shaped.

3. The cantilever assembly of claim 1 wherein the upper and lower cantilever arms are constructed from extruded aluminum.

4. The cantilever assembly of claim 1 wherein the upper and lower attachment brackets are constructed from extruded aluminum.

5. The cantilever assembly of claim 1 wherein each of the upper and lower cantilever arms features a central bore running parallel to the first longitudinal fastening channel that is at least partially threaded.

6. The cantilever assembly of claim 5 wherein each of the upper and lower cantilever arms features a plurality of ducts running parallel to the first longitudinal fastening channel and the central bore.

7. The cantilever assembly of claim 1 wherein the shaft portion of each of the first and second fasteners of the upper attachment bracket is threaded and further comprising a first lock nut engaging the threads of the first fastener shaft portion and a second lock nut engaging the threads of the second fastener shaft portion.

8. The cantilever assembly of claim 1 wherein the connector portion of the upper attachment bracket includes an upper fin having an opening therein and the connector portion of the lower attachment bracket includes a lower fin having an opening therein and further comprising a fastener passing through the openings of the upper and lower fins.

9. The cantilever assembly of claim 1 wherein the lower attachment bracket has a first leg portion attached to the connector and a second leg portion attached to the connector and spaced from and opposing the first leg portion and wherein the first fastener of the lower attachment bracket has a shaft portion and an oblong head portion and the second fastener of the lower attachment bracket has a shaft portion and an oblong head portion, where the shaft portion of the first fastener is attached to the first leg portion of the lower attachment bracket and the shaft portion of the second fastener is attached to the second leg portion of the lower attachment bracket and wherein the oblong head portion of the first fastener is positioned within the first fastening channel of the lower cantilever arm and the oblong head portion of the second fastener positioned within the second fastening channel of the lower cantilever arm.

10. An attachment bracket system for an upper cantilever arm and a lower cantilever arm, where each of the upper and lower cantilever arms has a first longitudinal fastening channel, a second longitudinal fastening channel that is generally parallel to the first longitudinal fastening channel, the attachment bracket system comprising:
   a) an upper attachment bracket including:
      i. a connector portion
      ii. a first leg portion and a second leg portion attached to the connector portion, said first and second leg portions spaced and opposing one another and defining a seat there between;
      iii. a first fastener having a shaft portion with a longitudinal axis and an oblong head portion and a second fastener having a shaft portion with a longitudinal axis and an oblong head portion;
      iv. said first leg portion having a first leg aperture passing there through and said second leg portion having a second leg aperture passing there through;
      v. the shaft portion of said first fastener passing through the first leg aperture of the first leg portion of the upper attachment bracket and the shaft portion of the second fastener passing through the second leg aperture of the second leg portion of the upper attachment bracket with the longitudinal axes of the first and second fastener shaft portions being axially aligned or generally parallel to each other;

vi. said oblong head portion of the first fastener adapted to be positioned within the first fastening channel of the upper cantilever arm and said oblong head portion of the second fastener adapted to be positioned within the second fastening channel of the upper cantilever arm when the upper cantilever arm is positioned within the seat of the upper attachment bracket;

b) a lower attachment bracket featuring:

i. a connector portion;

ii. a first fastener attached to the connector portion of the lower attachment bracket and adapted to be positioned within the first fastening channel of the lower cantilever arm and a second fastener attached to the connector portion of the lower attachment bracket and adapted to be positioned within the second fastening channel of the lower cantilever arm;

c) said upper and lower attachment brackets pivotally connected to one another.

11. The attachment bracket system of claim 10 wherein the upper and lower attachment brackets are constructed from extruded aluminum.

12. The attachment bracket system of claim 10 wherein the shaft portion of each of the first and second fasteners of the upper attachment brackets is threaded and further comprising a first lock nut engaging the threads of the shaft portion of the first fastener and a second lock nut engaging the threads of the shaft portion of the second fastener.

13. The attachment bracket system of claim 10 wherein the connector portion of the upper attachment bracket includes an upper fin having an opening therein and the connector portion of the lower attachment bracket includes a lower fin having an opening therein and further comprising a fastener passing through the openings of the upper and lower fins.

14. The attachment bracket system of claim 10 wherein the lower attachment bracket has a first leg portion attached to the connector and a second leg portion attached to the connector and spaced from and opposing the first leg portion and wherein the first fastener of the lower attachment bracket has a shaft portion and an oblong head portion and the second fastener of the lower attachment bracket has a shaft portion and an oblong head portion, where the shaft portion of the first fastener is attached to the first leg portion of the lower attachment bracket and the shaft portion of the second fastener is attached to the second leg portion of the lower attachment bracket and wherein the oblong head portion of the first fastener is adapted to be positioned within the first fastening channel of the lower cantilever arm and the oblong head portion of the second fastener is adapted to be positioned within the second fastening channel of the lower cantilever arm.

* * * * *